US 8,805,173 B2

(12) United States Patent
Kondo et al.

(10) Patent No.: US 8,805,173 B2
(45) Date of Patent: Aug. 12, 2014

(54) INFORMATION PRESENTATION DEVICE AND INFORMATION PRESENTATION METHOD

(75) Inventors: Tetsujiro Kondo, Tokyo (JP); Kazutaka Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/682,038

(22) PCT Filed: Oct. 27, 2008

(86) PCT No.: PCT/JP2008/069474
§ 371 (c)(1),
(2), (4) Date: Apr. 8, 2010

(87) PCT Pub. No.: WO2009/057562
PCT Pub. Date: May 7, 2009

(65) Prior Publication Data
US 2010/0209074 A1    Aug. 19, 2010

(30) Foreign Application Priority Data
Nov. 2, 2007  (JP) .................................. 2007-286449

(51) Int. Cl.
*H04N 5/783* (2006.01)
*H04N 9/12* (2006.01)
*G09G 5/00* (2006.01)

(52) U.S. Cl.
USPC ............................ 386/343; 345/1.3; 348/383

(58) Field of Classification Search
USPC .............. 386/343, E5.001; 345/1.3; 348/383, 348/E5.016, E5.144; 375/E7.019, E7.27
See application file for complete search history.

(56) References Cited

U.S. PATENT DOCUMENTS 5,621,429 A * 4/1997 Yamaashi et al. ............. 715/803
(Continued)

FOREIGN PATENT DOCUMENTS

JP          6 141229          5/1994
(Continued)

OTHER PUBLICATIONS

U.S. Appl. No. 12/681,715, filed Apr. 5, 2010, Kondo, et al.
(Continued)

*Primary Examiner* — Daquan Zhao
*Assistant Examiner* — Syed Hasan
(74) *Attorney, Agent, or Firm* — Oblon, Spivak, McClelland, Maier & Neustadt, L.L.P.

(57) ABSTRACT

The amount of information provided to a user is adjusted adaptively by means of a simple method.
To this end, the present invention includes delay sections 70A to 70D that each add a predetermined amount of delay to a picture whose playback speed has been converted, and output the picture to display sections 2B to 2E other than a first display section 2A of a plurality of display sections, and a playback speed converting section 60 that converts the playback speed of an input picture on the basis of a given variable, and outputs the converted playback speed to the first display section 2A and the delay sections 70A to 70D. Further, the present invention includes a gaze position judging section 40 that judges whether or not the position of a gaze detected by a gaze detecting section 3 detecting the position of the gaze of a user is on the screen of the first display section 2A, and outputs a judgment result, and a playback speed determining section 50 that determines a playback speed in accordance with the judgment result in the gaze position judging section 40, and outputs a variable according to the playback speed to a playback speed converting section 60.

20 Claims, 15 Drawing Sheets

(56) References Cited

U.S. PATENT DOCUMENTS

| | | | |
|---|---|---|---|
| 5,909,244 A * | 6/1999 | Waxman et al. | 348/222.1 |
| 6,400,932 B1 * | 6/2002 | Oh et al. | 455/150.1 |
| 2005/0168630 A1 * | 8/2005 | Yamada et al. | 348/383 |
| 2007/0078552 A1 * | 4/2007 | Rosenberg | 700/94 |
| 2010/0013757 A1 | 1/2010 | Ogikubo | |

FOREIGN PATENT DOCUMENTS

| JP | 2002 84449 | 3/2002 |
|---|---|---|
| JP | 2005 286378 | 10/2005 |
| JP | 2006 115469 | 4/2006 |
| JP | 2006 270829 | 10/2006 |
| JP | 2007 74038 | 3/2007 |
| WO | WO 2007/085682 A1 | 8/2007 |
| WO | WO 2007/111206 A1 | 10/2007 |

OTHER PUBLICATIONS

European Search Report issued Mar. 25, 2011, in Patent Application No. 08844606.7.

* cited by examiner

FIG. 1
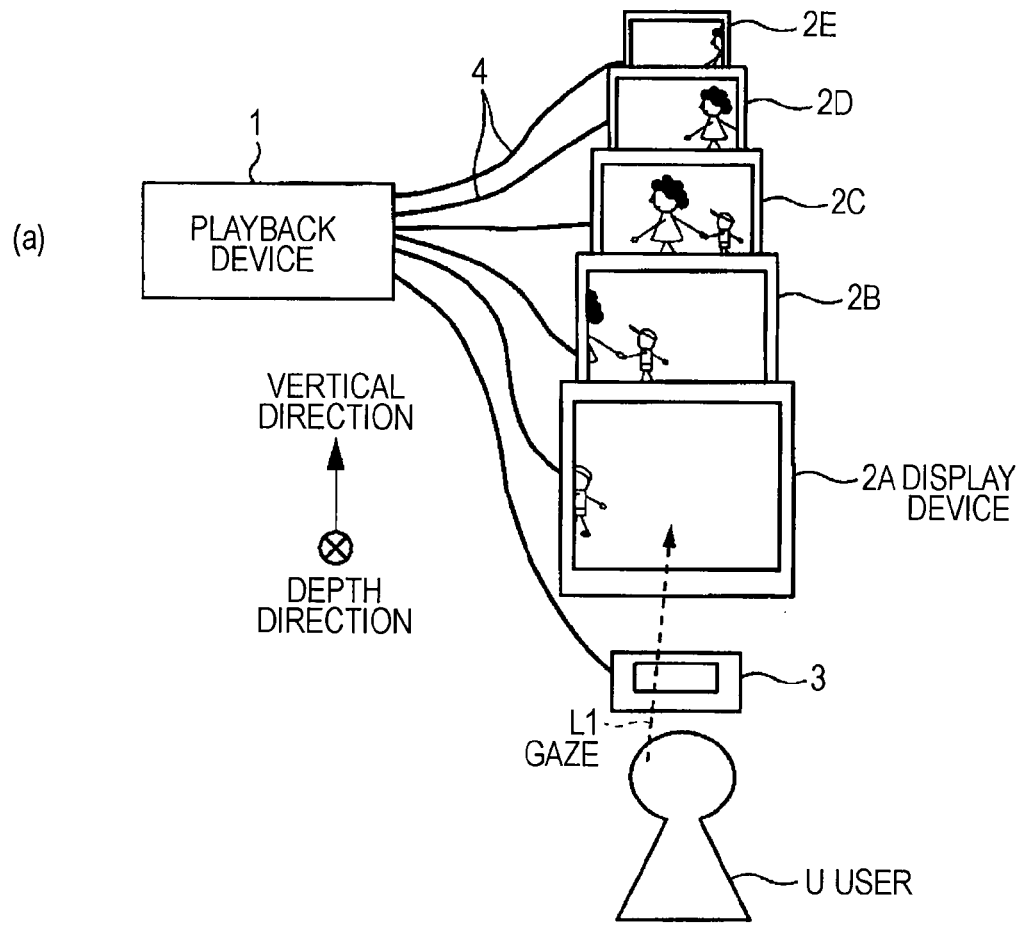
(a)
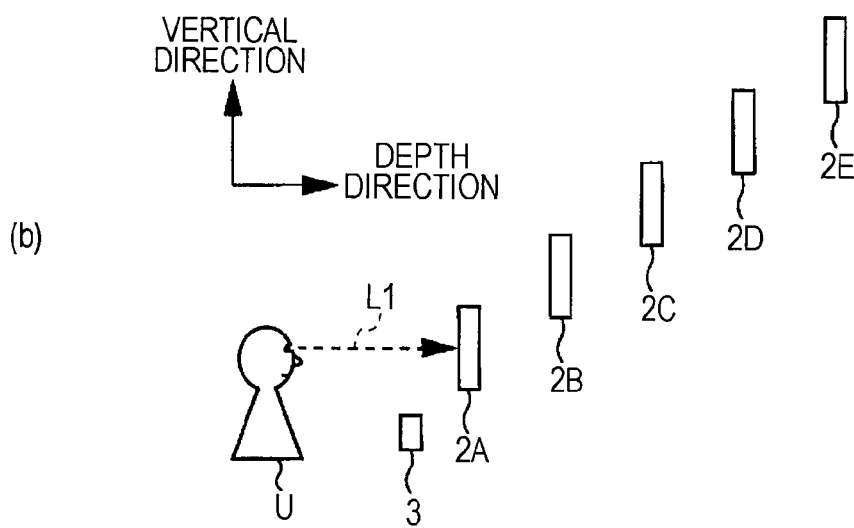
(b)

FIG. 6 (a)
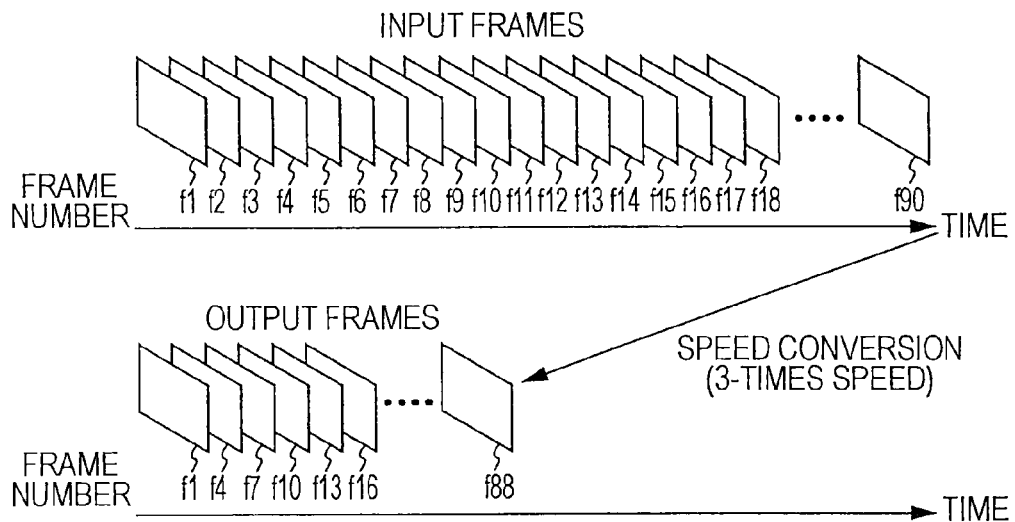
FIG. 6 (b)
FIG. 7 (a)
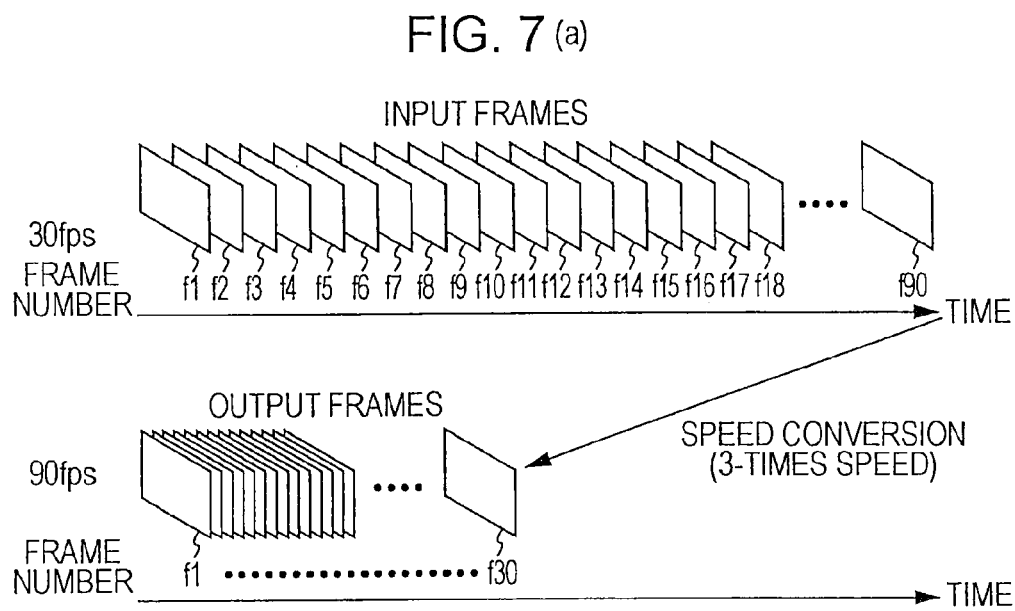
FIG. 7 (b)

INFORMATION PRESENTATION DEVICE AND INFORMATION PRESENTATION METHOD

TECHNICAL FIELD

The present invention relates to an information presentation apparatus and an information presentation method which are suitable for, for example, presenting information by using a plurality of display devices.

BACKGROUND ART

In the related art, when attempting to efficiently acquire information from a picture or the like that is being played back on a display device or the like, playback in fast motion or the like is performed. This is because by playing back in fast motion, it is possible to increase the amount of information that can be acquired in unit time. However, when viewing a picture played back in fast motion, users (viewers) often miss necessary information.

If information is missed, an operation of rewinding the playback position may be simply performed. However, there is a problem in that a rewind operation needs to be performed every time missing occurs, which is troublesome. In addition, such an operation can lower the efficiency of information acquisition all the more.

For this reason, it is also common to adjust the playback speed automatically in accordance with features of a picture, such as lowering the playback speed in scenes with lots of motion or raising the playback speed in scenes with few motion in a picture to be played back.

For example, Japanese Unexamined Patent Application Publication No. 10-243351 discloses detecting visual features in a picture including sound, and playing back the picture while automatically adjusting the playback speed in accordance with the visual features.

Incidentally, there are also users who want to perform playback while raising the picture playback speed even in scenes with lots of motion. That is, it can be said that the scene in which a user wants to lower or raise the picture playback speed differs depending on the condition in which each individual user is put, and the ability and preference of the user.

That is, it is considered that if the amount of information to be provided can be optimized in accordance with the condition in which a user is put, and the ability and preference of the user, the user can efficiently acquire necessary information from a playback picture. However, to optimize the amount of provision of information in accordance with the condition, ability, and preference of the user, first, it is necessary to measure the condition and ability of the user, and measurement of such data requires use of a large-scale device such as an electro-encephalograph, an electrocardiogram, or NIRS (Near-Infrared Spectroscopy). That is, since the cost mounts up, it is often difficult to realize an information presentation system.

Another conceivable technique for acquiring internal conditions such as the user's condition, ability, and preference without using such a device is to make the user report these pieces of information by himself/herself. However, making the user perform a complicated operation such as a key input increases the load imposed on the user, and it is expected that this will hinder efficient acquisition of information by the user all the more.

The present invention has been made in view of the above points, and its object is to adjust the amount of information provided to a user adaptively by means of a simple method.

DISCLOSURE OF INVENTION

The present invention includes a delay section that adds a predetermined amount of delay to a picture whose playback speed has been converted, and outputs the picture to a display section other than a first display section of a plurality of display sections, and a playback speed converting section that converts a playback speed of an input picture on the basis of a given variable, and outputs the converted playback speed to the first display section and the delay section. Further, the present invention includes a gaze position judging section that judges whether or not a position of a gaze detected by a gaze detecting section detecting a position of a gaze of a user is on a screen of a second display section of the plurality of display sections, and outputs a judgment result, and a playback speed determining section that determines the playback speed on the basis of the judgment result in the gaze position judging section, and outputs a variable according to the determined playback speed to the playback speed converting section.

In this way, when the user has missed information displayed on the first display section, and moved the gaze to another display section in which a delay is added to the picture, position information on the gaze is outputted from the gaze position judging section to the playback speed determining section. Then, in the playback speed determining section, a playback speed is determined in accordance with the judgment result outputted from the gaze position judging section, and a variable according to the determined playback speed is outputted from the playback speed determining section to the playback speed converting section.

According to the present invention, since the playback speed is adjusted in accordance with position information on the gaze of a user, the amount of information provided to the user is adaptively adjusted.

BRIEF DESCRIPTION OF DRAWINGS

FIG. 1 is an explanatory diagram showing an example of the configuration of a system according to a first embodiment of the present invention.

FIG. 6 is an explanatory diagram showing an example of processing in a playback speed converting section according to the first embodiment of the present invention, of which (a) shows input frames, and (b) shows output frames.

FIG. 7 is an explanatory diagram showing another example of processing in the playback speed converting section according to the first embodiment of the present invention, of which (a) shows input frames, and (b) shows output frames.

BEST MODES FOR CARRYING OUT THE INVENTION

Figure 2:
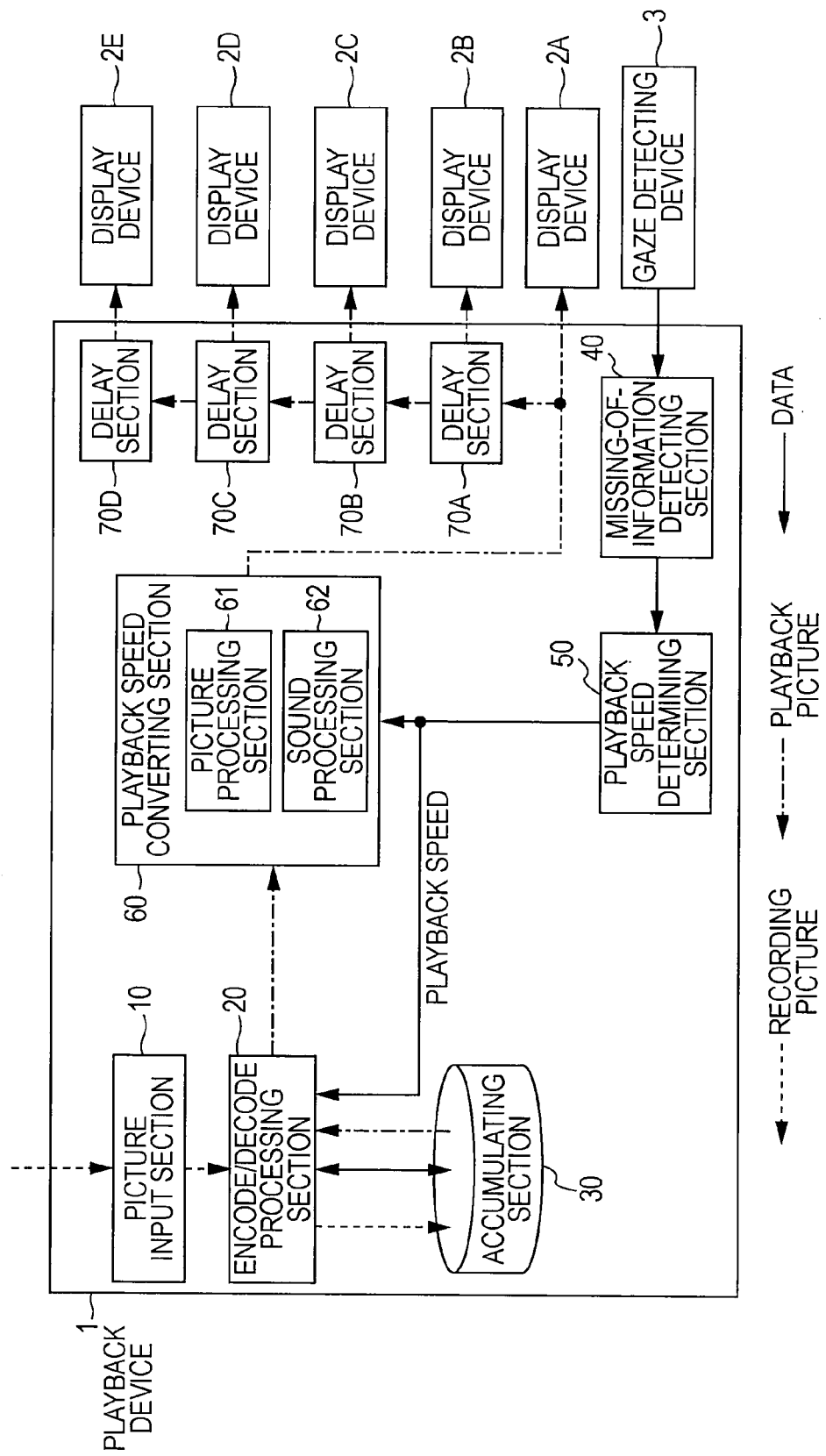
FIG. 2 is a block diagram showing an example of the internal configuration of the system according to the first embodiment of the present invention.

Hereinbelow, a first embodiment of the present invention will be described with reference to the attached drawings. An example of the configuration of a system according to this embodiment is shown in FIG. 1(a). The system shown in FIG. 1(a) includes a playback device 1 that plays back an image, a picture, or the like at a playback speed such as two-times speed, for example, a display device 2A, a display device 2B, a display device 2C, a display device 2D, and a display device 2E which display a playback picture, and a gaze detecting device 3 that detects the position of a gaze L1 of a user U by the position of the eyes of the user U. The display devices 2A to 2E and the gaze detecting device 3 are connected to the playback device 1 by cables 4. It should be noted that while this example is applied to the case in which five display devices are used, the number of display devices is not limited to this.

FIG. 1(b) shows a diagram in the case when the display devices 2A to 2E shown in FIG. 1(a) and the user U looking at them are seen from the lateral direction. The display devices 2A to 2E are configured by, for example, a liquid crystal panel or the like, and as shown in FIG. 1(b), are placed in such a way that their placement positions in the depth direction and the vertical direction are staggered, and thus appear to be placed in a longitudinal line as seen from the user U. The display device 2A is placed on the frontmost side in the depth direction and on the lowermost side in the vertical direction.

Further, the display device 2B is placed on the rear side in the depth direction, and on the upper side in the vertical direction with respect to the placement position of the display device 2A. Subsequently, the display devices 2C, 2D, and 2E are placed, with their positions shifted gradually toward the rear side in the depth direction and toward the upper side in the vertical direction. That is, the display device 2A is placed on the frontmost side for the user U, and the display device 2E is placed on the rearmost side in the vertical direction. It should be noted that while in FIGS. 1(a) and (b) illustration of a structure that holds the display devices 2A to 2E is omitted, a stepped stage on which the display sections are mounted, a column supporting each display section, or the like is to be used as the structure.

A picture of the same material read from an accumulating section 30 in the playback device 1 described later is displayed on the display devices 2A to 2E. The playback device 1 is provided with unillustrated delay sections, so that the picture displayed on the display devices 2A to 2E is delayed gradually as the placement position of each display device shifts to the rear side. Thus, an illusion of a picture moving from the front side to the rear side of the display devices is given to the user U.

The gaze detecting device 3 is a device that detects the position of a gaze L1 of the user U, and is placed at a position allowing the gaze L1 of the user U to be readily detected, such as a position facing the user U, for example. It should be noted that while this example uses a stationary type device as the gaze detecting device 3, gaze detection glasses of a type worn by the user U may be used. Alternatively, the position of the gaze L1 of the user U may be detected by a monitoring camera installed in a distant place.

Although the user U normally views a picture displayed on the display device 2A, upon missing information, to follow the missed information, the user U moves the gaze to a display device showing a picture that is delayed from the picture displayed on the display device 2A. That is, in this case, the gaze L1 of the user U moves towards the rear side from the display device 2A. The gaze detecting device 3 detects the motion of the gaze L1 or the position of the gaze L1 of the user U in such a case, and sends out the detection result to the playback device 1.

Next, an example of the internal configuration of the system will be described with reference to the block diagram shown in FIG. 2. The playback device 1 includes a picture input section 10, an encode/decode processing section 20, the accumulating section 30, a missing-of-information detecting section 40 as a gaze position judging section, a playback speed determining section 50, a playback speed converting section 60, and delay sections 70A, 70B, 70C, and 70D. In FIG. 2, a recording picture to be recorded onto the accumulating section 30 is indicated by broken lines, a playback picture to be played back on the display devices is indicated by alternate long and short dash lines, and data is indicated by solid lines.

The picture input section 10 captures a picture signal into the playback device 1 via an input terminal or the like, and performs a signal level conversion process. The encode/decode processing section 20 performs a process of encoding the picture signal inputted from the picture input section 10, and outputting the result as a recording picture to the accumulating section 30. Also, the encode/decode processing section 20 performs a process of decoding compressed picture data accumulated in the accumulating section 30, and outputting the result to the playback speed converting section 60. As for the rate of encoding, the same rate as the frame rate of a picture inputted from the picture input section 10 is used, and decoding is performed on the basis of a playback speed Vk (unit: multiple times speed) transmitted from the playback speed determining section 50 described later. The playback speed Vk is generated in the playback speed determining section 50 and transmitted to the playback speed converting section 60. Then, in the playback speed converting section 60, a process of converting a playback speed V at current time (at that point in time) to the playback speed Vk outputted from the playback speed determining section 50 is performed. The accumulating section 30 is configured by, for example, an HDD (Hard Disc Drive), and accumulates pictures encoded in the encode/decode processing section 20.

On the basis of a detection result inputted from the gaze detection device 3, the missing-of-information detecting section 40 associates the gaze position of the user U with the placement position of each of the display devices 2A to 2E, and upon judging that the gaze L1 of the user U is on a position other than the display device 2A, judges that missing of information by the user has occurred, and transmits the detection result to the playback speed determining section 50. If it is judged that the gaze L1 of the user U remains focused on the display device 2A, a judgment result indicating that missing of information by the user U has not occurred is transmitted to the playback speed determining section 50.

The playback speed determining section 50 has a variable Pinc for accelerating the current playback speed V, and a variable Pdec for slowing down the current playback speed V, and determines which of the variable Pinc and the variable Pdec is to be used, in accordance with the detection result transmitted from the missing-of-information detecting section 40. A numerical value such as, for example, 1.5 is used as the variable Pinc and, for example, 0.5 is used as the variable Pdec. The playback speed determining section 50 multiples the current playback speed V by one of the variables to calculate the playback speed Vk. The value of Pinc may be any value that is larger than 1, and the value of Pdec may be any value that is larger than 0 but smaller than 1. Then, the calculated playback speed Vk is outputted to the playback speed converting section 60. Details about processing in the missing-of-information detecting section 40 and the playback speed determining section 50 will be described later.

The playback speed converting section 60 includes a picture processing section 61 and a sound processing section 62. The picture processing section 61 performs a process of converting the playback speed so that the playback speed V of a picture outputted from the encode/decode processing section 20 becomes the playback speed Vk inputted from the playback speed determining section 50. Then, the picture whose playback speed has been converted is supplied to the display device 2A, and also to the delay section 70A, the delay section 70B, the delay section 70C, and the delay section 70D. The sound processing section 62 performs a process of converting the playback speed without changing the pitch, by means of a technique such as removing silent portions or portions of continuous sound features in a sound signal. An example of specific processing for converting sound playback speed is described in Japanese Unexamined Patent Application Publication No. 2000-99097. Details about processing in the playback speed converting section 60 (picture processing section 61) will be described later.

The delay section 70A adds a delay amount of D seconds to the picture outputted from the playback speed converting section 60, and sends out the result to the display device 2B and the delay section 70B. The D seconds is, for example, two seconds or the like, which can be set to an arbitrary value in accordance with the number of display devices 2, or the information acquisition ability and preference of the user. The delay section 70B further adds a delay of D seconds to the picture transmitted from the delay section 70A, and outputs the result to the display device 2C and the delay section 70C.

The delay section 70C further adds a delay of D seconds to the picture transmitted from the delay section 70B, and outputs the result to the display device 2D and the delay section 70D. The delay section 70D further adds a delay of D seconds to the picture transmitted from the delay section 70C, and outputs the result to the display device 2E. That is, a picture that is delayed by 4D seconds from the picture displayed on the display device 2A is displayed on the display device 2E.

Next, referring to the flowchart in FIG. 3, an example of processing in the missing-of-information detecting section 40 will be described. First, on the basis of gaze position information inputted from the gaze detecting device 3, the missing-of-information detecting section 40 judges whether or not the gaze of the user U is on the screen on the frontmost side, that is, on the display device 2A (step S1). If it is judged that the gaze L1 of the user U is on the display device 2A, it is regarded that missing of information by the user U has not occurred (step S2), and a detection result indicating that "missing has not occurred" is outputted (step S4). If it is judged that the gaze of the user U is not on the display device 2A, it is regarded that missing of information by the user U has occurred (step S3), and a detection result indicating that "missing has occurred" is outputted.

Figure 3:
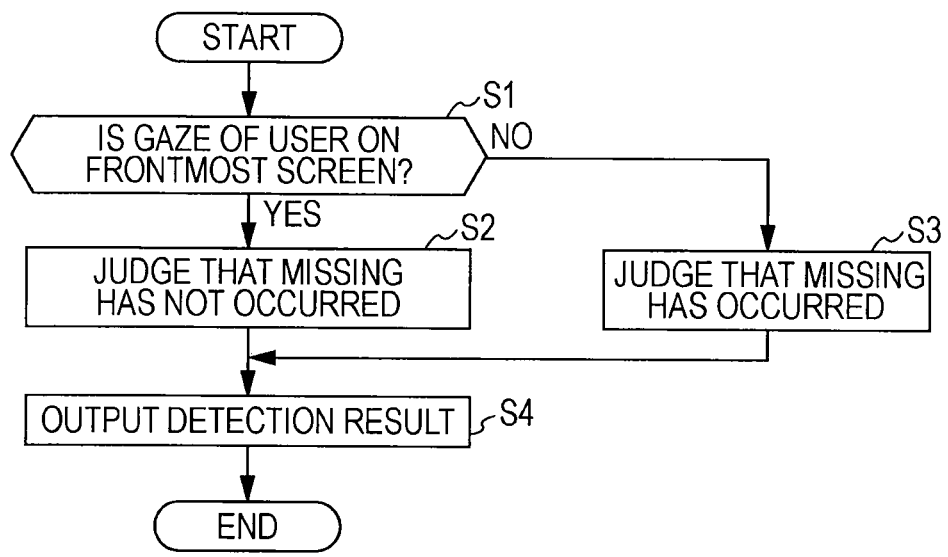
FIG. 3 is a flowchart showing an example of processing in a missing-of-information detecting section according to the first embodiment of the present invention.

It should be noted that in the example shown in FIG. 3, whether or not missing of information by the user U has occurred is judged in accordance with the criterion of whether or not the position of the gaze L1 of the user U is on the display device 2A on the frontmost side. However, the judgment may be made by using another criterion. For example, information on the motion of the gaze L1 may be taken into consideration together with position information on the gaze L1. An example of processing in that case is shown in FIG. 4.

Figure 4:
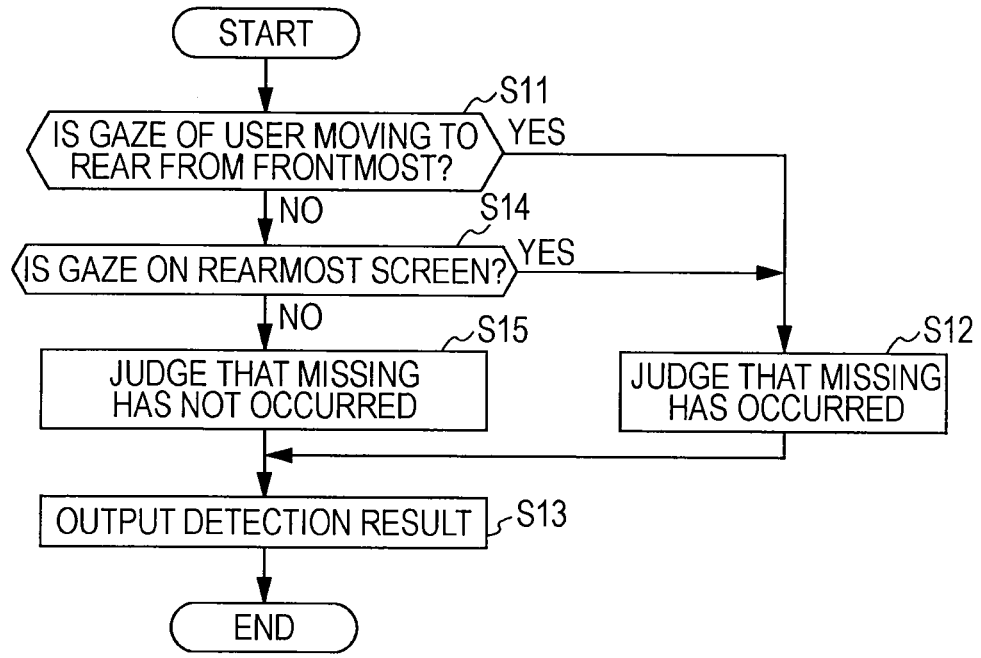
FIG. 4 is a flowchart showing another example of processing in the missing-of-information detecting section according to the first embodiment of the present invention.

In FIG. 4, the missing-of-information detecting section 40 first judges whether or not the gaze L1 of the user U is moving toward the rear from the frontmost, that is, the placement position of the display device 2A (step S11). If it is judged that the gaze L1 of the user U is moving toward the rear side, it is regarded that missing of information by the user U has occurred, and it is judged that "missing has occurred" (step S12) and the detection result (judgment result) is outputted (step S13). If it is judged that the gaze L1 of the user U is not moving toward the rear from the placement position of the display device 2A, next, it is judged whether or not the gaze L1 of the user U is on the rearmost screen, that is, on the display device 2E (step S14).

If it is judged that the gaze L1 of the user U is on the display device 2E, it is regarded that missing of information by the user U has occurred (step S12), and a detection result indicating that "missing has occurred" is outputted (step S13). If it is judged that the gaze L1 of the user U is not on the display device 2E, it is regarded that missing of information by the user U has not occurred (step S15), and a detection result indicating that "missing has not occurred" is outputted (step S13).

Next, referring to the flowchart in FIG. 5, an example of processing in the playback speed determining section 50 will be described. First, on the basis of a detection result transmitted from the missing-of-information detecting section 40, the playback speed determining section 50 judges whether or not missing of information by the user U has occurred (step S21). If the detection result transmitted from the missing-of-information detecting section 40 indicates that "missing has occurred", the playback speed V at that point in time is multiplied by the variable Pdec to calculate the playback speed Vk (step S22). If Pdec is 0.5, and the playback speed V at that point in time is 1-time speed, the playback speed Vk is 0.5 (Pdec)×1(V)=0.5-time speed. That is, if it is judged that missing of information by the user U has occurred, a process of slowing down the playback speed is performed. It should be noted that the case when the playback speed V is 1-time speed refers to the case when playback is being performed while keeping the frame rate of pictures recorded in the accumulating section 30.

If the detection result transmitted from the missing-of-information detecting section 40 indicates that "missing has not occurred", the playback speed V at that point in time is multiplied by the variable Pinc to calculate the playback speed Vk (step S23). If Pinc is 1.5, and the playback speed V is 1-time speed, the playback speed Vk is 1.5×1=1.5-times speed. Then, the playback speed Vk calculated in step S22 or step S23 is outputted to the encode/decode processing section 20 and the playback speed converting section 60 (step S24). That is, if it is judged that missing of information by the user U has not occurred, it is judged that there is still some room for acquisition of information by the user U, and a process of accelerating the playback speed is performed.

In the playback speed converting section 60, the playback speed Vk is a value prior to undergoing playback speed conversion. In the playback speed converting section 60, a process of converting the playback speed V at that point in time to the playback speed Vk, that is, a process of converting the playback speed Vk to a new playback speed V is performed. Thus, the playback speed V is changed on the basis of the playback speed Vk whenever necessary. For example, if the playback speed V is 1.5 times, and it is judged in the judgment in step S21 that missing of information has occurred, in step S22, 0.5 (Pdec)×1.5 (playback speed V) is calculated, so the playback speed Vk is obtained as 0.75. Then, through a playback speed conversion process in the playback speed converting section 60, the playback speed Vk=playback speed V=0.75-time speed.

Next, referring to FIG. 6, an example of processing in the playback speed converting section 60 will be described. FIG. 6(a) shows a state in which frames inputted to the playback speed converting section 60 are sequentially arranged in time series from the left, and FIG. 6(b) shows a state in which individual frames outputted from the playback speed converting section 60 are likewise sequentially arranged in time series from the left. In FIG. 6, the respective frames are assigned frame numbers f1 to fn (n is a natural number).

The number of frames inputted to the playback speed converting section 60 is obtained as playback speed Vk x block size B. The block size B is calculated by multiplying the interval T of time at which the routine of the playback speed converting section 60 is carried out, by the frame rate fr of pictures accumulated in the accumulating section 30. For example, if the interval T of time at which the routine of the playback speed converting section 60 is carried out is one second, and the frame rate fr of pictures accumulated in the accumulating section 30 is 30 fps, the block size B is 1(T)×30(B)=30 (frames). Then, if the playback speed Vk is 3, the number of frames inputted to the playback speed converting section 60 is 30×3=90 (frames).

The number of frames inputted to the playback speed converting section 60 is, in other words, the number of frames extracted by the encode/decode processing section 20 from the accumulating section 30. The encode/decode processing section 20 calculates the number of frames to be extracted from the accumulating section 30, on the basis of the playback speed Vk inputted from the playback speed determining section 50, the frame rate fr of pictures recorded in the accumulating section 30, and the interval T of time at which the routine of the playback speed converting section 60 is carried out. Then, a number of frames equal to the calculated number of frames are extracted and outputted to the playback speed converting section 60.

FIG. 6(a) shows an example in which a picture of 90 frames is inputted to the playback speed converting section 60. The playback speed converting section 60 performs conversion of playback speed by thinning out frames at a fixed sampling interval so that the acquired frames fall with the block size B. For example, if the block size B is 30, a process of thinning out the acquired 90 frames in 3-frame units to 30 frames is performed. FIG. 6(b) shows the frames thinned out to 30 frames, illustrating that the thinned-out 30 frames are made up of frame numbers f1, f4, f7, f10 . . . f88 of the frames inputted from the encode/decode processing section 20. In the example shown in FIG. 6, the playback speed is increased by three times by performing such processing. Since this technique can be realized without using a complicated configuration, the scale of hardware can be kept small by using this technique.

It should be noted that while the example shown in FIG. 6 is directed to the case in which conversion of playback speed is performed by thinning out frames inputted from the encode/decode processing section 20 at a fixed sampling interval, the playback speed may be converted by converting the frame rate itself. For example, by converting the frame rate of 90 frames shown in FIG. 7(a) from 30 fps to 90 fps, 90 frames' worth of picture may be outputted at a frame rate of 90 fps as shown in FIG. 7(b). Since all the inputted frames are outputted by this processing, flicker in the output picture is reduced, thereby making it possible to obtain a high-quality picture.

Figure 8:
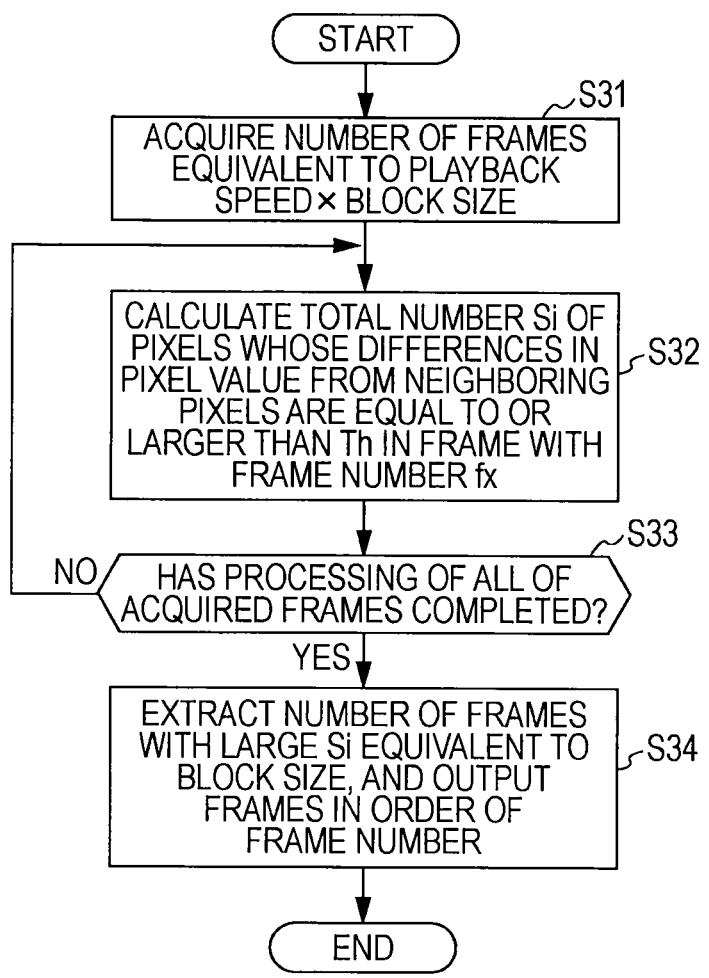
FIG. 8 is a flowchart showing an example of processing in a case when frames with large amounts of information are left according to the first embodiment of the present invention.

Alternatively, speed conversion may be performed by extracting only frames with large amounts of information as frames for playback, from among the frames inputted from the encode/decode processing section 20. An example of processing in this case is shown in the flowchart in FIG. 8. The processing shown in FIG. 8 is performed at an interval of one second (that is, T=1). First, by the encode/decode processing section 20, a number of frames equivalent to playback speed Vk×block size B are acquired from the accumulating section 30 (step S31). Next, after calculating the difference in pixel value between each target pixel and its neighboring pixels in a frame with a frame number fx (x represents a predetermined number between 1 to n), the total number Si of pixels whose differences in pixel value from neighboring pixels are equal to or larger than a threshold Th is calculated (step S32). That is, the total number Si of pixels mentioned above is calculated for all of frames inputted from the encode/decode processing section 20.

In step S31, for example, if the playback speed Vk is 1.5, and the block size is 30, 1.5×40=45 frames are acquired. Thus, frame numbers to be processed in step S32 are f1 to f45. As the threshold Th to be used in step S32, for example, a numerical value such as 50 is set.

The process in step S32 is performed with respect to all of the frames acquired in step S31. In step S33, it is judged whether or not processing of all the frames has been completed. If it is judged that processing has been completed in all of the frames, next, a process is performed which extracts a number of frames equivalent to the block size which have large total numbers Si of pixels whose differences in pixel value from neighboring pixels are equal to or larger than the threshold Th, and outputs the frames in order of frame number (step S34).

Figure 9:
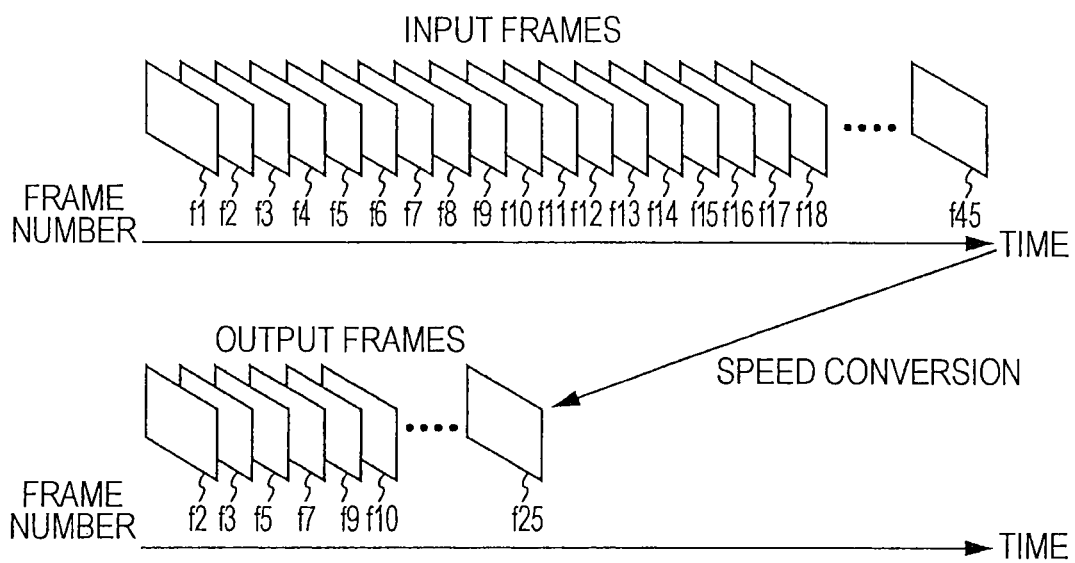
FIG. 9 is an explanatory diagram showing another example of processing in the playback speed converting section according to the first embodiment of the present invention, of which (a) shows input frames, and (b) shows output frames.

FIG. 9 shows an example in the case when such processing is performed. FIG. 9(a) shows a state in which 45 frames inputted to the playback speed converting section 60 are arranged from left in order of lowest frame number. FIG. 9(b) shows a state in which from among these 45 frames, a number of frames equivalent to the block size, that is, 30 frames with large Si, which represents the total number of pixels whose differences in pixel value from neighboring pixels are equal to or larger than the threshold Th, are extracted, and arranged in order of frame number. FIG. 9(b) shows that the 30 frames outputted from the playback speed converting section 60 are made up of frame numbers f2, f3, f5, f7, f9, f10 ... f25. That is, according to the method shown in FIG. 8 and FIG. 9, the playback speed can be accelerated (by 1.5 times in the example of FIG. 8 and FIG. 9) by extracting only frames with large amounts of information. Also, according to such processing, among input frames, frames that have a high possibility of including a large amount of character information such as a telop can be left, thus eliminating a situation in which information necessary for the user is deleted by the speed conversion process. This makes it possible for the user U to acquire information efficiently.

According to the configuration and processing in this embodiment described above, whether or not missing of information by the user U has occurred is judged on the basis of information on the position of the gaze L1 of the user U or information on the transition in the time direction of the gaze L1, and if it is judged that missing has occurred, a process of slowing down the playback speed is performed. Thus, even when the user U has missed information, the missed information can be checked on the screen of a display device placed on the rear side with ample leeway.

Also, if it is judged that missing has not occurred, it is regarded that there is still more room for acquisition of information by the user U, and the playback speed becomes faster. Thus, the user U can acquire information more efficiently.

Further, since whether or not missing of information by the user U has occurred is automatically judged, there is no need to make the user U report his/her internal conditions. Thus, there is no load imposed on the user U, and the user U can concentrate acquisition of information.

It should be noted that information to be presented on the display devices 2A to 2E may not necessarily be a picture but may be a still image or only character information such as a telop.

It should be noted that the above-mentioned embodiment is configured such that the picture playback speed is raised if the gaze L1 of the user is on the display device 2A. However, a configuration is also possible in which the playback speed is not changed while the gaze L1 of the user U is on the display device 2A.

Figure 10:
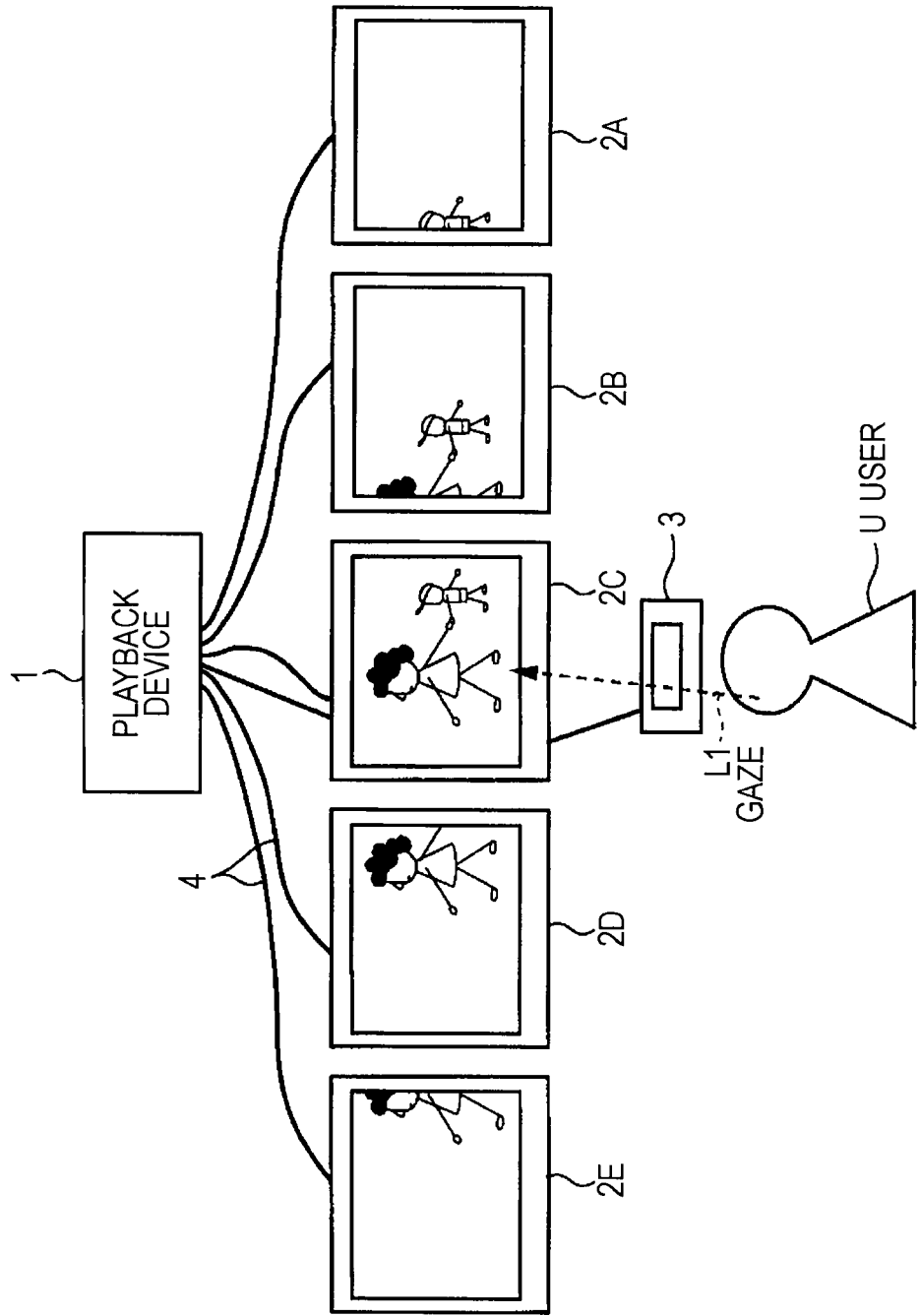
FIG. 10 is an explanatory diagram showing an example of the configuration of a system according to another mode of the first embodiment of the present invention.

Also, while the above-mentioned embodiment is directed to the case in which the display devices 2A to 2E are arranged in the longitudinal direction (depth direction), the display devices 2A to 2E may be arranged in the lateral direction. An example of system configuration in this case is shown in FIG. 10. In FIG. 10, portions corresponding to FIG. 1 are denoted by the same reference numerals. The display device 2A is placed at the right end of FIG. 10, and the display device 2B is placed at a predetermined interval on the left next to the display device 2A. Subsequently, likewise, the display device 2C, the display device 2D, and the display device 2E are placed on the left next to the display device 2B, the display device 2C, and the display device 2D, respectively.

The internal configuration of this system is the same as the configuration shown in FIG. 2. That is, while the display device 2A is directly connected with the playback speed converting section 60, the display devices 2B to 2E are connected with the delay sections 70A to 70D, respectively. Thus, a picture with no added delay is displayed on the display device 2A, a picture delayed by 2D from the picture displayed on the display device 2A is displayed on the display device 2B, and a picture delayed by 4D seconds from the picture displayed on the display device 2A is displayed on the display device 2E placed at the leftmost end. This gives the user U an illusion of the picture displayed on each display device 2 moving from right to left, that is, from the display device 2A side to the display device 2E side.

Figure 11:
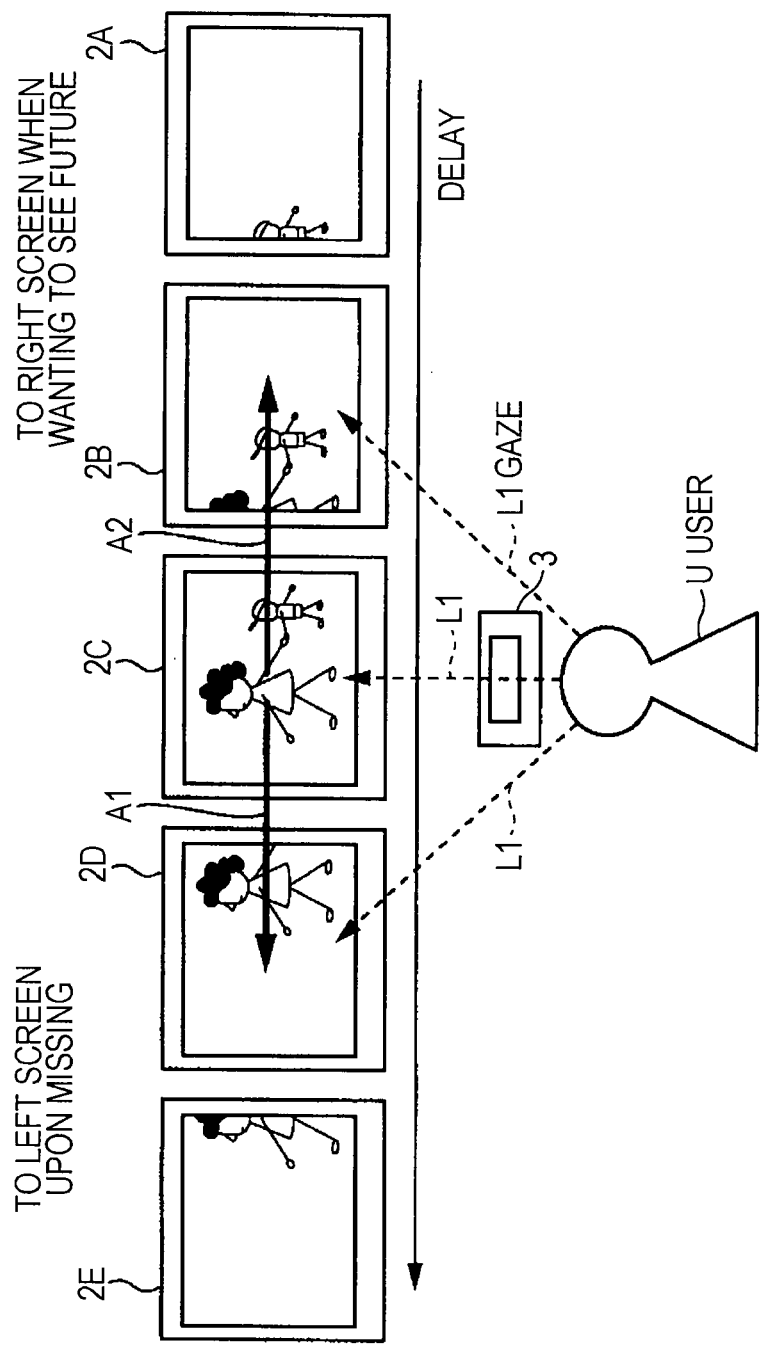
FIG. 11 is a schematic diagram showing an example of operation by a user according to another mode of the first embodiment of the present invention.

In the system shown in FIG. 10, when the user U misses information such as a telop while viewing the display device 2C (second display section) placed at the center, to check the missed information again, the gaze is moved to the display device 2D or the display device 2E displaying a picture that is temporally delayed from the display device 2C. That is, if information is missed, the gaze is moved in a leftward direction. Also, when wanting to see a future picture of the picture that is being displayed on the display device 2C, the user U moves the gaze to the display device 2B or the display device 2A already displaying a picture that is to be displayed on the display device 2C from now on. That is, if missing of information has not occurred, and there is still more room for acquisition of information, the gaze is moved in a rightward direction. FIG. 11 is a schematic diagram of the operation of the user U in this case. As shown in FIG. 11, when wanting to check a missed picture again, the user U shifts the gaze in a leftward direction (the direction of arrow A1), and when wanting to see a temporally future picture, the user U shifts the gaze in a rightward direction (the direction of arrow A2).

Figure 12:
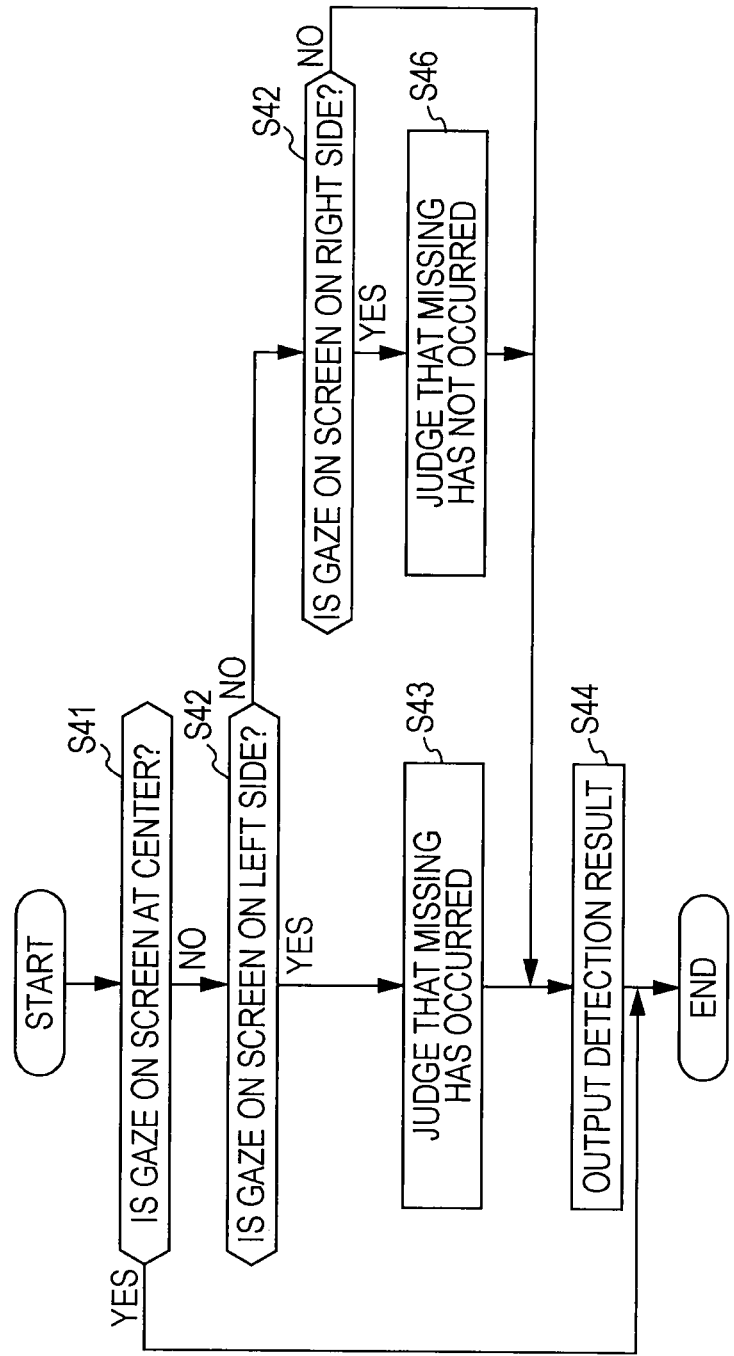
FIG. 12 is a flowchart showing an example of processing in the missing-of-information detecting section according to another mode of the first embodiment of the present invention.

In the example shown in FIG. 10, a process is performed in which the playback speed is not converted when the gaze of the user U is on the display device 2C at the center, the playback speed is raised when the gaze has moved to the right side, and the playback speed is slowed down when the gaze has moved to the left side. An example of processing in the missing-of-information detecting section 40 (see FIG. 2) in this case will be described with reference to FIG. 12. First, on the basis of information transmitted from the gaze detecting device 3, the missing-of-information detecting section 40 judges whether or not the gaze of the user U is on the screen of the display device 2C at the center (step S41). If it is judged that the gaze L1 of the user U is on the screen at the center (the screen of the display device 2C), the processing is ended without performing anything.

If it is judged that the gaze L1 of the user U is not on the screen at the center, next, it is judged whether or not the gaze L1 of the user U is on the screen of the display device placed on the left side of the display device 2C (step S42). If it is judged that the gaze L1 of the user U is on the screen on the left side, it is judged that missing of information by the user U has occurred (step S43), and a detection result indicating that "missing has occurred" is transmitted to the playback speed determining section 50 (see FIG. 1) (step S44).

If it is judged in step S42 that the gaze L1 of the user U is not on the screen on the left side, next, it is judged whether or not the gaze L1 of the user U is on the screen on the right side (step S45). If it is judged that the gaze L1 of the user U is not on the screen on the right side, it is judged that missing of information by the user U has not occurred (step S46), and a detection result indicating that "missing has not occurred" is outputted to the playback speed determining section 50 (see FIG. 1) (step S44).

Figure 5:
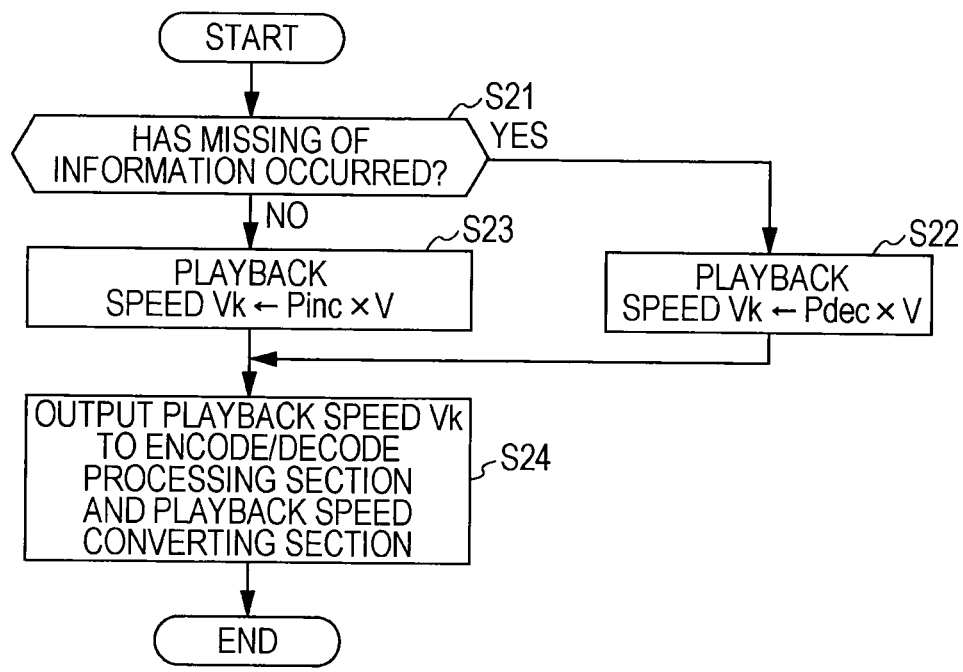
FIG. 5 is a flowchart showing an example of processing in a playback speed determining section according to the first embodiment of the present invention.

The playback speed determining section 50 performs the processing described in the flowchart in FIG. 5, and if the detection result transmitted from the missing-of-information detecting section 40 indicates that "missing has occurred", multiples the current playback speed V at that point in time by the variable Pdec to calculate the playback speed Vk (step S22), and outputs the calculated playback speed V to the encode/decode processing section 20 and the playback speed converting section 60 (step S24). If the detection result transmitted from the missing-of-information detecting section 40 indicates that "missing has not occurred", the playback speed V at that point in time is multiplied by the variable Pinc to calculate the playback speed Vk (step S23), and the calculated playback speed Vk is outputted to the encode/decode processing section 20 and the playback speed converting section 60 (step S24).

As described above, the variable Pinc is a variable for accelerating the playback speed V, and the variable Pdec is a variable for slowing down the playback speed V. Then, in the playback speed converting section 60, the playback speed V at that point in time is converted to the playback speed Vk by being multiplied by the variable Pinc or the variable Pdec. That is, if the gaze L1 of the user U is on a display device placed on the left side from the center, it is judged that missing of information has not occurred, and a process of accelerating the picture playback speed is performed. Also, if the gaze L1 of the user U is on a display device placed on the left side from the center, it is judged that missing of information has occurred, and a process of slowing down the picture playback speed is performed.

By performing such processing, for example, the playback speed V is accelerated when the user U has moved the gaze L1 to a display device on the right side, and if the accelerated playback speed is optimal for the user U, the user U views the picture on the display device 2C placed at the center. While the gaze L1 of the user U is on the display device 2C, the playback speed is not changed, so that the user U can keep a preferred playback speed by continuing to view the picture displayed on the display device 2C.

Figure 13:
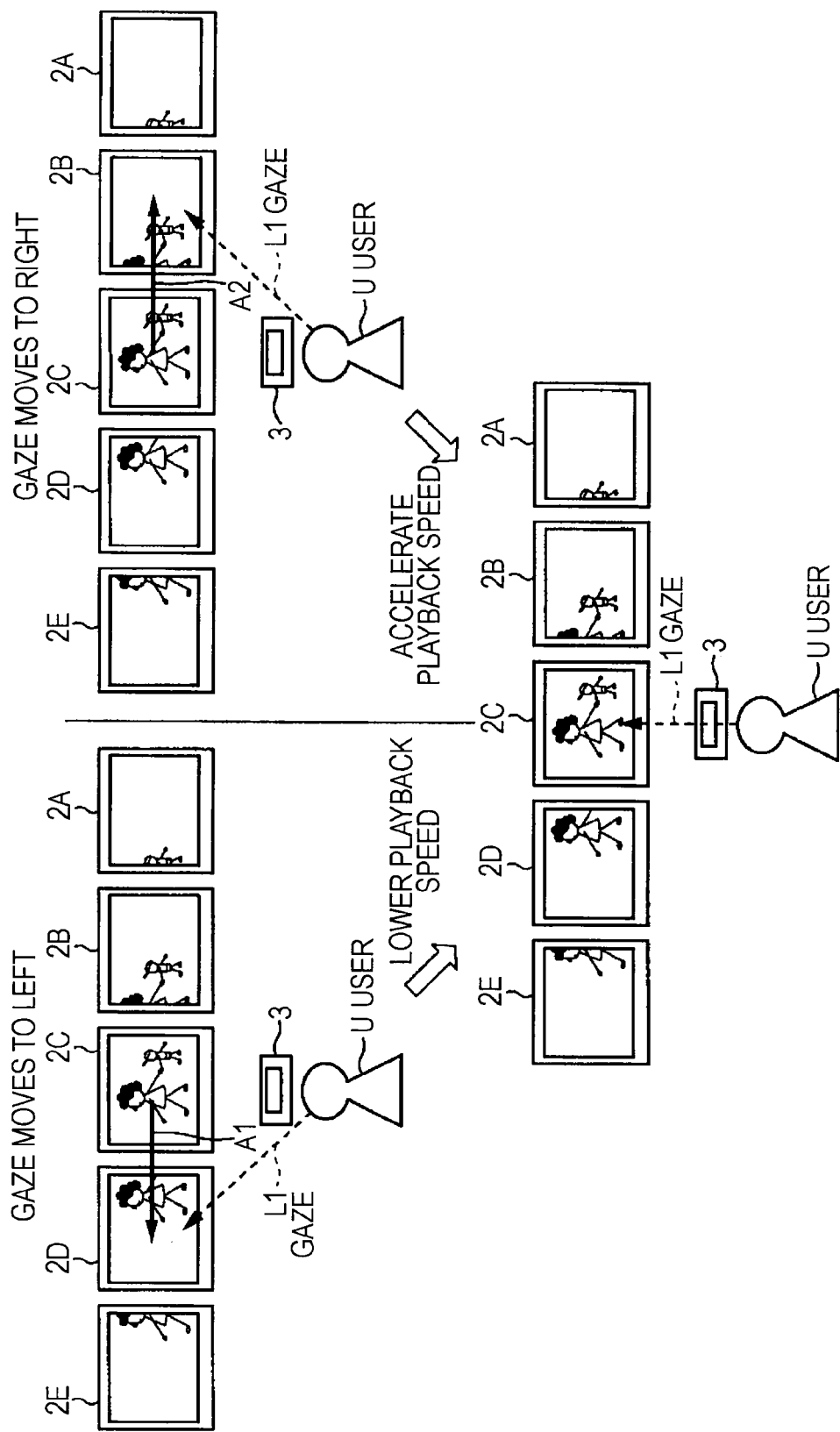
FIG. 13 is a schematic diagram showing an example of relation between a playback speed conversion process and a user's operation according to another mode of the first embodiment of the present invention.

If the user U has missed information due to the accelerated playback speed, the user U moves the gaze L1 from left to right to follow the missed information. Then, the playback speed V is slowed down if the gaze L1 has moved onto a display device placed on the left side from the center. As such movement of the gaze is repeated, display at an optimal speed for the user U is made on the display device 2C placed at the center. That is, as shown in FIG. 13, a process is performed in which the picture playback speed is lowered if the gaze of the user U has moved to the left side (direction of arrow A1), and the picture playback speed is accelerated if the gaze of the user U has moved to the right side (direction of arrow A2), so the gaze L1 of the user U will naturally focus on the display device 2C placed at the center. That is, the amount of information to be presented is adaptively adjusted in accordance with the information acquisition ability, usage condition, and preference of the user U.

It should be noted that while the example shown in FIG. 10 is directed to the case in which the display device 2A displaying a picture with no added delay is placed on the rightmost side, this may be also applied to a configuration in which the display device 2A is placed at the left end, and the picture displayed on each display device is delayed as the placement position shifts to the right.

Next, a second embodiment of the present invention will be described with reference to FIG. 14 to FIG. 16. In this embodiment, a process is performed in which if it is judged that missing of information by the user U has occurred, the information missed by the user U is presented again on the display device 2A placed on the frontmost side with respect to the user U. The placement of the display devices 2A to 2E is assumed to be the placement shown in FIG. 1.

Figure 14:
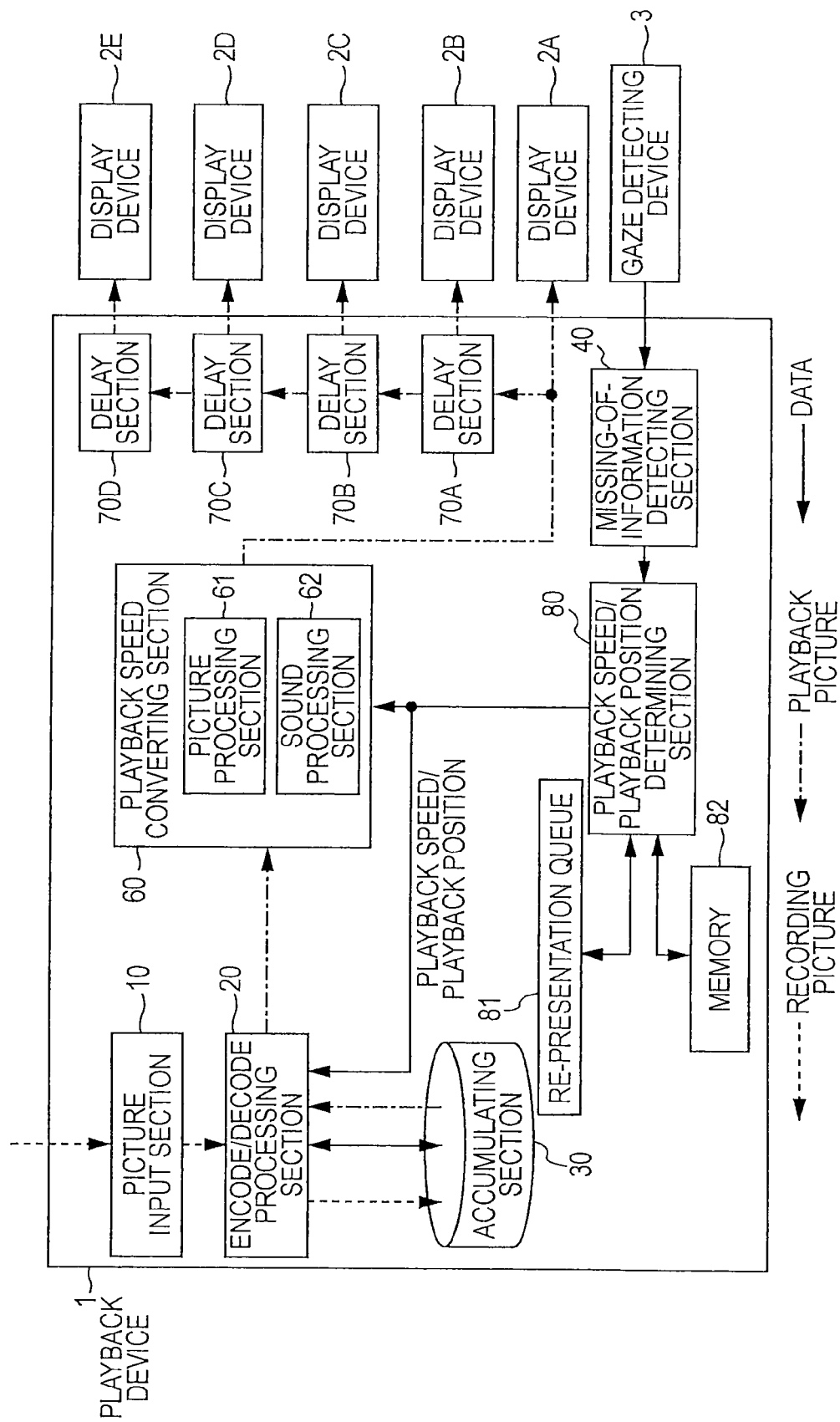
FIG. 14 is a block diagram showing an example of the internal configuration of a system according to a second embodiment of the present invention.
Figure 15:
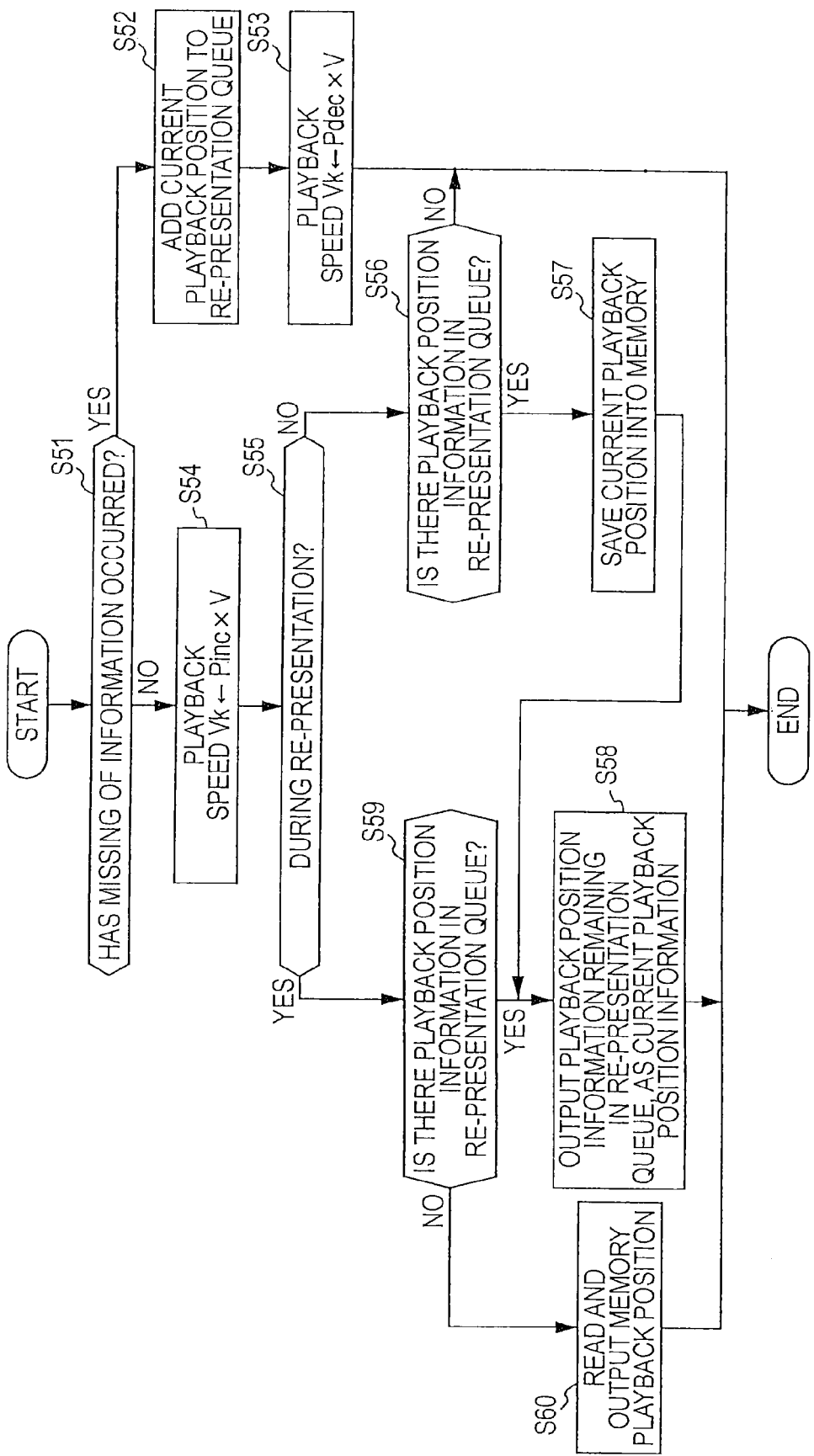
FIG. 15 is a flowchart showing an example of processing in a playback speed/playback position determining section according to the second embodiment of the present invention.

FIG. 14 is a block diagram showing an example of the configuration of a system according to this embodiment. In FIG. 14, portions corresponding to FIG. 2 are denoted by the same reference numerals. The system shown in FIG. 14 includes a playback device 1', the display device 2A, the display device 2B, the display device 2C, the display device 2D, and the display device 2E that display a playback picture, and the gaze detecting section 3 that detects the position of the gaze L1 of the user U.

First, the configuration of the playback device 1' will be described. The playback device 1' includes the picture input section 10, the encode/decode processing section 20, the accumulating section 30, the missing-of-information detecting section 40, a playback speed/playback position determining section 80, the playback speed converting section 60, and the delay sections 70A, 70B, 70C, and 70D. Since the configuration of each of the picture input section 10, the encode/decode processing section 20, the accumulating section 30, the missing-of-information detecting section 40, the playback speed converting section 60, and the delay sections 70A to 70D is the same as the configuration in the first embodiment, description thereof is omitted. The playback speed/playback position determining section 80 is connected with a re-presentation queue 81 as a re-presentation information storing section, and a memory 82 as a playback position storing section.

The playback speed/playback position determining section 80 has the variable Pinc and the variable Pdec, and determines which of the variable Pinc and the variable Pdec is to be used, in accordance with the detection result transmitted from the missing-of-information detecting section 40. The processing up to this point is the same as that in the playback speed determining section 50 described in the first embodiment. As described in the first embodiment, the missing-of-information detecting section 40 judges that missing of information by the user U has occurred, if the gaze L1 of the user U is not on the display device 2A, has moved to the rear side from the display device 2A, or is on the display device 2E placed on the rearmost side.

If the detection result transmitted from the missing-of-information detecting section 40 indicates that missing of information by the user U has occurred, the playback speed/playback position determining section 80 stores the frame number (playback position information) of the picture that is being displayed on the display device 2E, into the re-presentation queue 81, and transmits the playback position information to the encode/decode processing section 20. The re-presentation queue 81 is configured by a FIFO (First In First Out) type memory or the like. It should be noted that while in this example the frame number of the frame that is being displayed on the display device 2E placed on the rearmost side is stored into the re-presentation queue 81, the frame being displayed on a display device at which the gaze L1 is positioned may be stored.

The playback speed/playback position determining section 80 is configured to check whether or not playback position information is accumulated in the re-presentation queue 81 at a predetermined interval, and if playback position information is present in the re-presentation queue 81, pass a frame number stored as the playback position information to the encode/decode processing section 20. If information missed by the user U is being presented again on the display device 2A, and playback position information is accumulated in the re-presentation queue 81, a process is performed in which the frame number of the frame displayed on the display device 2E at that point in time is stored into the memory 82.

The encode/decode processing section 20 reads a frame corresponding to the frame number sent from the playback speed/playback position determining section 80, and outputs the frame to the playback speed converting section 60. Then, the playback speed converting section 60 performs a process of converting an inputted frame to a predetermined playback speed for output to the display device 2A. Through this configuration, information missed by the user U is presented again on the display device 2A located closest to the user U. If missing of information by the user U has not occurred, not-yet-presented pictures accumulated in the accumulating section 30 are outputted to the display devices 2A to 2E. It should be noted that information to be presented again on the display device 2A need not be a picture but may be only character information such as a telop.

Next, details about processing in the playback speed/playback position determining section 80 will be described with reference to the flowchart in FIG. 15. First, it is judged whether or not missing of information by the user U has occurred in the detection result sent from the missing-of-information detecting section 40 (step S51). If it is judged that missing of information has occurred, a process is performed in which the current display position (the frame number of the frame being displayed on the display device 2E) is added to the re-presentation queue 81 (step S52), and a new playback speed Vk is set by multiplying the current playback speed V by the variable Pdec (step S53).

If it is judged in step S41 that missing of information has not occurred, a process of setting a new playback speed Vk by multiplying the current playback speed V by the variable Pinc is performed (step S54). Then, next, it is judged whether or not information missed by the user U is being presented again on the display device 2A (step S55). If it is judged that information is not being presented again, it is judged whether or not playback position information is accumulated in the re-presentation queue 81 (step S56), and the processing is ended if no playback position information is accumulated.

If information missed by the user U is being presented again on the display device 2A, and playback position information is accumulated in the re-presentation queue 81, the frame that is being displayed on the display device 2E is saved into the memory 82 as the current playback position (step S57). Then, the playback position information accumulated in the re-presentation queue 81 is outputted to the encode/decode processing section 20 as the current playback position information (step S58).

If it is judged in step S55 that missed information is not being presented again, it is judged whether or not playback position information is accumulated in the re-presentation queue 81 (step S59). If it is judged that playback position information is accumulated in the re-presentation queue 81, the processing proceeds to step S58, and a process of outputting the playback position information accumulated in the re-presentation queue 81 to the encode/decode processing section 20 as the current playback position information is performed. If it is determined in step S59 that playback position information is not accumulated in the re-presentation queue 81, a process of reading playback position information stored in the memory 82 and outputting the playback position information to the encode/decode processing section 20 is performed (step S60).

By performing such processing, information missed by the user U is presented again on the display device 2A, and picture playback position information is stored into the memory 82 even during the re-presentation of information. Then, a picture corresponding to the playback position information stored in the memory 82 is read after the information re-presentation process is finished, so the continuation of the picture displayed prior to the re-presentation is displayed on the display device 2A.

Figure 16:
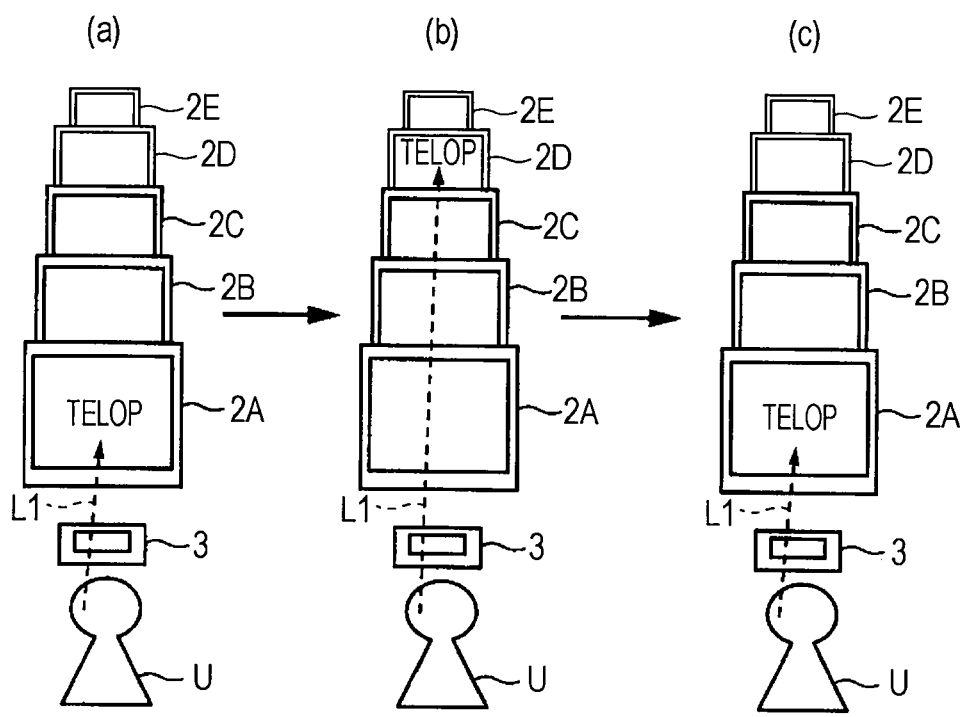
FIG. 16 is an explanatory diagram showing an example of information re-presentation process according to the second embodiment of the present invention.

FIG. 16 is a diagram illustrating an information re-presentation process. As shown in FIG. 16(a), if the user U has missed important information such as a telop displayed on the display device 2A, the gaze L1 of the user U follows the telop and moves toward the rear side (see FIG. 16(b)). That is, the gaze L1 is not on the display device 2A. Thus, the missing-of-information detecting section 40 having received a detection result from the gaze detecting device 3 judges that missing of information by the user U has occurred. The judgment result is outputted to the playback speed/playback position determining section 80, the frame number of the frame that is being displayed on the display device 2E at that point in time is added to the re-presentation queue 81, and also the playback speed V is multiplied by the variable Pdec to calculate a new playback speed Vk. The frame number to be stored in the re-presentation queue 81, and the playback speed Vk are also outputted to the encode/decode processing section 20 and the playback speed converting section 60.

The encode/decode processing section 20 performs a process of reading, from the accumulating section 30, a frame corresponding to the frame number outputted from the playback speed/playback position determining section 80. The frame read from the accumulating section 30 is inputted to the playback speed converting section 60, and the playback speed is converted to Vk in the playback speed converting section 60. Then, the picture whose playback speed has been converted to Vk is outputted to the display device 2A. That is, information such as a telop missed by the user U is presented again on the display device 2A (see FIG. 16(c)).

According to the configuration and processing in this embodiment described above, if the gaze L1 of the user U is not on the display device 2A, it is regarded that missing of information by the user U has occurred, and the picture viewed by the user U at that time is presented again on the display device 2A. Thus, missing of information by the user U can be prevented with reliability.

Figure 17:
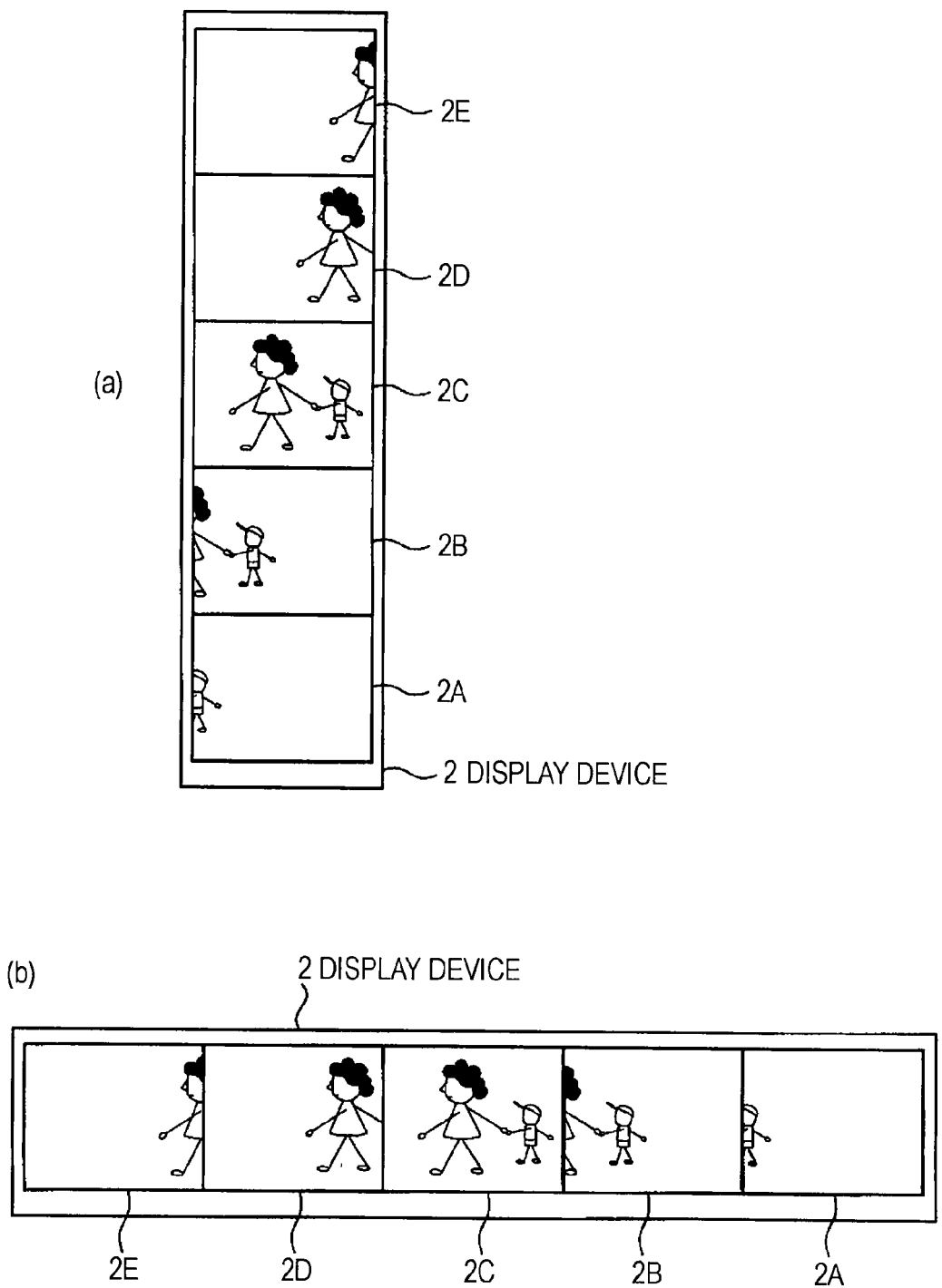
FIG. 17 is an explanatory diagram showing an example of the configuration of a display device according to another mode of the present invention.

Also, while the embodiments described so far are directed to the example in which a plurality of display devices 2 are used, the screen of a single display device 2 may be split into a plurality of display regions, and a picture may be outputted with respect to each of the split regions. FIG. 17(a) shows an example in the case of splitting the screen of the display device 2 in five in the longitudinal direction, and FIG. 17(b) shows an example in the case of splitting the screen of the display device 2 in five in the lateral direction. The same effect as the effect according to the above-mentioned embodiments can be attained also by using such a display device 2.

Explanation of Reference Numerals 1 playback device, 2, 2A to 2B display device, 3 gaze detecting device, 4 cables, 10 picture input section, 20 encode/decode processing section, 30 accumulating section, 40 missing-of-information detecting section, 50 playback speed determining section, 60 playback speed converting section, 61 picture processing section, 62 sound processing section, 70A to 70D delay section, 80 playback speed/playback position determining section, 81 re-presentation queue, 82 memory, A1, A2 arrow, B block size, L1 gaze, Pdec, Pinc variable, Si total number, T interval, th threshold, U user, V, Vk playback speed, f1, f2 frame number, fr frame rate, fx frame number

The invention claimed is:

1. An information presentation apparatus comprising:
delay circuitry configured to add a predetermined amount of delay to a picture whose playback speed has been converted, and to output the picture to display circuitry other than first display circuitry of a plurality of display circuitries in accordance with the predetermined amount of delay, the predetermined amount of delay being set in accordance with an order of placement of each of the plurality of display circuitries in relation to each other;

playback speed converting circuitry configured to convert a first playback speed of an input picture to a second playback speed based on a predetermined variable, and to output the second playback speed to the first display circuitry and the delay circuitry;

gaze position judging circuitry configured to judge whether a position of a gaze of a user is on a second screen associated with second display circuitry of the plurality of display circuitries, and to output a judgment result of the gaze of the user detected by gaze detecting circuitry configured to determine a position of an eye of the user with respect to screens associated with the plurality of display circuitries; and playback speed determining circuitry configured to determine the second playback speed based on a judgment result in the gaze position judging circuitry, and to output the predetermined variable according to the determined second playback speed to the playback speed converting circuitry.

2. The information presentation apparatus according to claim 1, wherein the first display circuitry and the second display circuitry are the same.

3. The information presentation apparatus according to claim 2, wherein the playback speed determining circuitry is configured to output a first variable that accelerates the first playback speed to the playback speed converting circuitry when it is judged that the position of the gaze detected by the gaze detecting circuitry is on a first screen associated with the first display circuitry, and to output a second variable that slows down the first playback speed to the playback speed converting circuitry when it is judged that the position of the gaze detected by the gaze detecting circuitry is not on the first screen associated with the first display circuitry.

4. The information presentation apparatus according to claim 2, wherein the playback speed determining circuitry is configured so as to not output the predetermined variable to the playback speed converting circuitry when it is judged that the position of the gaze detected by the gaze detecting circuitry is on a first screen associated with the first display circuitry.

5. The information presentation apparatus according to claim 1, wherein the plurality of display circuitries are arranged sequentially at a predetermined interval, beginning with the first display circuitry.

6. The information presentation apparatus according to claim 5, wherein the plurality of display circuitries are arranged at the predetermined interval, beginning with the first display circuitry, so that their distance in a depth direction from the first display circuitry gradually increases.

7. The information presentation apparatus according to claim 6, wherein the gaze position judging circuitry is configured to output a first variable that slows down the playback speed to the playback speed converting circuitry when it is detected that the gaze of the user is moving in the depth direction from a position of the first display circuitry or when it is judged that the gaze of the user is on another screen associated with display circuitry of the plurality of display circuitries which is placed at a rearmost position in the depth direction.

8. The information presentation apparatus according to claim 5, wherein the playback speed determining circuitry is configured to output a first variable that accelerates the playback speed to the playback speed converting circuitry when it is judged that the position of the gaze detected by the gaze detecting circuitry is not on the second screen associated with the second display circuitry and that the position of the gaze is on a first screen associated with display circuitry of the plurality of display circuitries arranged in a direction in which the first display circuitry is arranged, and to output a second variable that slows down the playback speed to the playback speed converting circuitry when it is judged that the position of the gaze detected by the gaze detecting circuitry is not on the second screen associated with the second display circuitry and that the position of the gaze is on another screen associated with display circuitry of the plurality of display circuitries arranged in a direction other than the direction in which the first display circuitry is arranged.

9. The information presentation apparatus according to claim 8, wherein the playback speed determining circuitry is configured to not output either of the first variable or the second variable to the playback speed converting circuitry when it is judged that the position of the gaze detected by the gaze detecting circuitry is on the second screen associated with the second display circuitry.

10. The information presentation apparatus according to claim 1, further comprising:

accumulating circuitry configured to accumulate an encoded input picture; and encode/decode processing circuitry configured to perform a process of encoding the input picture and outputting the encoded input picture to the accumulating circuitry, and to perform a process of decoding the input picture accumulated in the accumulating circuitry and outputting the decoded input picture, wherein when it is judged that the position of the gaze detected by the gaze detecting circuitry is not on a first screen associated with the first display circuitry, the playback speed determining circuitry outputs a frame number of a picture that is displayed using predetermined display circuitry of the plurality of display circuitries at a time when the judgment is made and a first variable that slows down the playback speed to the encode/decode processing circuitry and the playback speed converting circuitry, the encode/decode processing circuitry is configured to read from the accumulating circuitry a frame corresponding to the frame number output from the playback speed determining circuitry, and to output the frame to the playback speed converting circuitry, and the playback speed converting circuitry is configured to convert the first playback speed of the frame outputted from the encode/decode processing circuitry based on the first variable that slows down the playback speed output from the playback speed determining circuitry, and to output the second playback speed to the first display circuitry.

11. The information presentation apparatus according to claim 10, wherein the predetermined display circuitry is display circuitry of the plurality of display circuitries arranged at a position furthest from the first display circuitry.

12. The information presentation apparatus according to claim 10, wherein the predetermined display circuitry is display circuitry of the plurality of display circuitries, other than the first display circuitry, which is at the position of the gaze detected by the gaze detecting circuitry.

13. The information presentation apparatus according to claim 10, further comprising:

re-presentation information storing circuitry configured to store the frame number output by the playback speed determining circuitry; and playback position storing circuitry configured to store the frame number of the picture displayed on the predetermined display circuitry when the frame number is stored in the re-presentation information storing circuitry, wherein, when the frame corresponding to the frame number output from the playback speed determining circuitry is not displayed using the first display circuitry, and the frame number is stored in the re-presentation information storing circuitry, the playback speed determining circuitry outputs the frame number of the picture displayed using the predetermined display circuitry to the playback position storing circuitry, reads the frame number stored in the re-presentation information storing circuitry, and outputs the read frame number to the encode/decode processing circuitry.

14. The information presentation apparatus according to claim 13, wherein, when the frame corresponding to the frame number outputted from the playback speed determining circuitry is displayed using the first display circuitry, and the frame number is not stored in the re-presentation information storing circuitry, the playback speed determining circuitry reads the frame number stored in the playback position storing circuitry and outputs the read frame number to the encode/decode processing circuitry.

15. The information presentation apparatus according to claim 1, wherein the playback speed converting circuitry is configured to convert the first playback speed by thinning out frames constituting the input picture at a predetermined interval.

16. The information presentation apparatus according to claim 1, wherein the playback speed converting circuitry is configured to convert the first playback speed by changing a frame rate of the input picture.

17. The information presentation apparatus according to claim 1, wherein the playback speed converting circuitry is configured to convert the first playback speed by calculating a total number of pixels whose differences in pixel value from neighboring pixels are equal to or larger than a predetermined value, in each frame of the input picture, and to output a predetermined number of frames in order from a frame in which the calculated total number of pixels whose differences in pixel value from the neighboring pixels are equal to or larger than the predetermined value.

18. The information presentation apparatus according to claim 1, wherein each of the plurality of display circuitries is split into a plurality of regions.

19. The information presentation apparatus according to claim 1, wherein the predetermined amount of delay is different for each of the plurality of display circuitries such that each display circuitry causes display of an associated picture corresponding to the input picture at a corresponding delayed time.

20. An information presentation method comprising:
displaying a picture whose playback speed has been converted, using first display circuitry of a plurality of display circuitries;
adding a delay in units of a predetermined frame period to an input picture, and outputting the input picture to the plurality of display circuitries other than the first display circuitry in accordance with the added delay that is set in accordance with an order of placement of the plurality of display circuitries in relation to each other;
detecting a position of a gaze of a user and outputting a detection result thereof, the gaze of the user being detected by gaze detecting circuitry configured to determine a position of an eye of the user with respect to screens associated with the plurality of display circuitries;
judging whether the detected position of the gaze is on a first screen associated with the first display circuitry, and outputting a judgment result thereof;
determining a second playback speed in accordance with the judgment result, and outputting a variable according to the second playback speed; and
converting a first playback speed of the input picture to the second playback speed in accordance with the output variable.

* * * * *